Patented Aug. 2, 1932

1,870,098

UNITED STATES PATENT OFFICE

HARRY WILLIAM COX AND DONALD HENRY MOORE, OF WESTON-SUPER-MARE, ENGLAND; SAID MOORE ASSIGNOR TO SAID COX

ANTITOBACCO CONFECTION

No Drawing. Application filed November 12, 1930, Serial No. 495,286, and in Great Britain December 18, 1929.

This invention relates to a confection to be chewed by a person for relieving the craving for smoking tobacco, beside having a salutary tonic effect on the system and to the process of manufacturing such confection.

According to this invention an anti-tobacco confection is prepared by melting gum chicle in a gentle heat and then adding glucose and thoroughly admixing, and when the glucose is dissolved, adding icing sugar admixed and dissolved in the other material, and to this material oil of peppermint and powdered cinchona bark are added, the whole being amalgamated by stirring until the whole becomes a semi-plastic mass, when the substance is rolled to form a flat sheet and left to dry, and then slightly warmed, rolled and covered with icing sugar, and finally cut into tablets.

As an example of how the invention can be practiced for say 46 lbs. of the confection we employ:

10 lbs. gum chicle.
   28 lbs. icing sugar.
   7 lbs. glucose.
   ½ lb. oil of peppermint.
   ½ lb. powdered cinchona bark.
   ———
   46 lbs.

We place the gum chicle in a steam jacketed stirrer pan and bring same to a melted or semi-fluid condition under a gentle heat, and when melted we add the glucose, thoroughly stirring and admixing the two together, the glucose dissolving in the gum, and after admixing, 17 lbs. of the icing sugar is then added this being thoroughly admixed and also dissolved in the other material. The oil of peppermint and the powdered cinchona bark are then added and the whole thoroughly amalgamated together by the stirrers and beaters, the stirring action continuing until the whole becomes a semi-plastic mass.

The mass is then removed from the pan and separate portions are placed on a slab and worked with rollers several times folding the material in flat sheets, one roller being adjusted at each rolling to make each sheet slightly thicker, this repeated rolling further assisting in amalgamating the material.

After rolling, each sheet is removed and placed upon a slab in a room having a dry warm atmosphere for a period of about 24 hours.

After this drying the sheets of material are again slightly warmed and passed through rollers to roll them into sheets of the required thickness and after rolling, the sheets are covered on both sides with the remaining 11 lbs. of icing sugar which adheres to the surfaces and each sheet is then passed through a cutting machine to produce tablets 1 inch square.

The tablets are then wrapped singly or in pairs in tin foil ready for sale and use.

What we do claim as our invention and desire to obtain by Letters Patent is:—

1. A confection comprising a chewing sweet having therein gum chicle with which is incorporated powdered cinchona bark as an anti-tobacco agent.

2. A process for the manufacture of an anti-tobacco confection comprising melting gum chicle under a gentle heat, when melted adding glucose thereto and admixing, dissolving icing sugar in the mass after the glucose is dissolved, then adding oil of peppermint and powdered cinchona bark to the mass, amalgamating the whole by stirring into a semi-fluid mass, further amalgamating the mass by rolling, and then drying, rolling and covering the mass with icing sugar, substantially as described.

In testimony whereof we have hereunto set our hands.

HARRY WILLIAM COX.
DONALD HENRY MOORE.